United States Patent [19]
Lempicke

[11] Patent Number: 5,841,370
[45] Date of Patent: Nov. 24, 1998

[54] METHOD AND APPARATUS FOR DETERMINING AIRCRAFT BANK ANGLE USING SATELLITE NAVIGATIONAL SIGNALS

[76] Inventor: Thomas A. Lempicke, 2129 Squire Rd., Rock Hill, S.C. 29730

[21] Appl. No.: 774,756

[22] Filed: Dec. 30, 1996

Related U.S. Application Data

[60] Provisional application No. 60/025,746 Sep. 20, 1996.
[51] Int. Cl.$^6$ .................................................. G01C 23/00
[52] U.S. Cl. ..................... 340/975; 340/967; 244/165; 244/171; 342/357; 701/200; 701/213
[58] Field of Search .................................... 340/975, 967, 340/974, 973, 971; 364/448, 441, 447; 701/3, 4, 5; 244/164, 165, 171; 342/357

[56] References Cited

U.S. PATENT DOCUMENTS

| | | | |
|---|---|---|---|
| 4,835,537 | 5/1989 | Manion | 342/30 |
| 4,866,450 | 9/1989 | Chisholm | 342/410 |
| 4,881,080 | 11/1989 | Jablonski | 342/357 |
| 5,195,039 | 3/1993 | Gold et al. | 701/7 |
| 5,216,611 | 6/1993 | McElreath | 701/221 |
| 5,228,854 | 7/1993 | Eldridge | 934/11 |
| 5,451,963 | 9/1995 | Lempicke | 342/357 |
| 5,541,591 | 7/1996 | Bush | 340/968 |

*Primary Examiner*—Jeffery A. Hofsass
*Assistant Examiner*—Benjamin C. Lee
*Attorney, Agent, or Firm*—Kennedy Covington Lobdell & Hickman, LLP

[57] ABSTRACT

An apparatus for determining the bank angle of an aircraft and method includes a receiver for receiving navigational signals from NAVSTAR/GPS satellites in orbit about the earth, a signal processor for demodulating the satellite navigational signals, an arrangement for determining a sensitivity value, the sensitivity value being defined as the amount of bank angle displayed per rate of change of track heading, an arrangement for determining the rate of change of the aircraft track heading from the navigational signals, an arrangement for determining the bank angle of the moving aircraft from the sensitivity value.

14 Claims, 5 Drawing Sheets

METHOD AND APPARATUS FOR DETERMINING AIRCRAFT BANK ANGLE USING SATELLITE NAVIGATIONAL SIGNALS

This application is based on provisional application Ser. No. 60/025,746 filed Sep. 20, 1996, now abandoned.

BACKGROUND OF THE INVENTION

The present invention relates broadly to aircraft instrumentation and, more particularly, to an apparatus for determining and displaying the bank angle of a moving aircraft based on satellite navigational signals.

An aircraft turns by banking which is caused by oppositely deflecting ailerons. As the aircraft turns in a banking manner, the pilot requires some visual indicator of the aircraft banking attitude to coordinate the turn, maintain the desired course and to safely operate the aircraft. The banking attitude is the aircraft bank angle or angle of bank. Bank angle indicators are common instrumentation in an aircraft and are sometimes combined with a bubble/level device to form a combined instrument known as a turn coordinator. The display associated with this device gives the pilot necessary information regarding performance of a coordinated turn. As the aircraft turns, winds can cause lateral forces to affect the aircraft turning movement, tending to slip the aircraft sideways. The rudder may be moved in correcting response to lateral forces causing the aircraft to slip. The lateral forces are displayed on the turn coordinator using the bubble-type device similar to a carpenter's level. However, it is the bank angle which actually defines the extent and rate of the turn in coordination with aircraft speed. Current bank angle indicators or turn coordinators are based on gyroscopes and use the precession of the gyroscope in combination with a correction factor to determine bank angle. The bank angle is displayed on the turn coordinator using a tilting aircraft silhouette.

Currently, satellite guidance has become widely used for navigation and promises to be a significant advance in air navigation. The current system known as NAVSTAR, GLONASS (Russian), or simply the global positioning system (GPS) provides complete navigational guidance anywhere in the world, twenty-four hours a day, and is highly accurate. The US NAVSTAR system was originally developed for military use and, accordingly, reports at two levels of accuracy. The first is the precision mode for military use which is accurate to within 16 meters laterally and vertically and the coarse/acquisition mode for civilian use provides three-dimensional position accurate to within 100 meters. NAVSTAR/GPS functions virtually free of all environmental limitations providing reliability at all times of the day or night, during all seasons, in all weather conditions, and free of solar disturbances. Further, NAVSTAR/GPS offers a relatively inexpensive system from the user's point of view. While the satellites themselves are enormously expensive, the satellite navigation units are well within reach of those with such a need. The navigation receiver units may be mounted with an aircraft, other vehicles, or with hand-held, computer-coordinated displays. Further, the NAVSTAR/GPS is a passive system not requiring interrogation by the user.

NAVSTAR/GPS provides twenty-four satellites in synchronous orbit about the earth. Each satellite contains four atomic clocks so that their time and position is precisely known. Therefore, a conventional triangulation fix is possible and the time of the fix is also known. One of the inherent problems is that, while the satellites can carry four atomic clocks, the ground units typically use a quartz oscillator so that the timing on the receiving end is somewhat inaccurate. To compensate for this, a navigation signal is obtained using four satellites with the fourth satellite providing a time correction. The NAVSTAR/GPS navigational signals may be used for determining a precise location above the earth or on the earth to determine longitude, latitude and altitude. As may be expected, given the known position information and an accurate clock, derivative information may be obtained from the navigational signals and applied in various ways.

SUMMARY OF THE INVENTION

It is accordingly an object of the present invention to use derivative information from the NAVSTAR/GPS satellite system to provide an accurate and reliable indication of aircraft bank angle. It is a further object of the present invention to provide a display unit for displaying the NAVSTAR/GPS derived bank angle in an aircraft control panel instrument. It is another object of the present invention to provide accurate aircraft bank angle information displayed in a hand-held instrument, which may be a dedicated instrument for providing only aircraft bank angle or may be incorporated into any of the commercially available GPS navigational receivers.

To that end, an apparatus for determining the bank angle of an aircraft includes a receiver for receiving navigational signals from satellites in orbit around the earth and a signal processor for demodulating the satellite navigational signals. Further, the present invention includes an arrangement for determining a sensitivity value for the indicator, with the sensitivity value being defined as the amount of bank angle displayed per rate of change of track heading, an arrangement for determining the rate of change of the aircraft track heading from the navigational signals and an arrangement for determining the bank angle of the aircraft from the aircraft speed and the rate of change in track heading wherein the bank angle is proportional to the change rate of track heading and the sensitivity value. Preferably, the sensitivity determining arrangement, the heading change rate determining arrangement and the bank angle determining arrangement includes an electronic circuit configured to detect and evaluate a predetermined sensitivity value preprogrammed during manufacture of the apparatus. It is preferred that the receiver include at least one antenna for receiving positional signals from the satellites.

Preferably, the apparatus includes an electronic circuit having a predetermined value of sensitivity applied thereto and an arrangement for adjusting the predetermined value accessible by a pilot and the sensitivity determining arrangement includes an electronic circuit configured to detect and evaluate the sensitivity value. The present invention further preferably includes an arrangement for determining aircraft speed using the satellite navigation signals and the sensitivity value is determined using the aircraft speed. It is further preferred that the sensitivity determining arrangement include an arrangement for determining a sensitivity value based on aircraft orientation when the aircraft is executing a banking maneuver of a known angular value.

The apparatus preferably further includes a control arrangement for controlling signals into and out of the arrangement for determining a sensitivity value and the control arrangement affects the sensitivity value based on predetermined values within the control arrangement and from feedback from the arrangement for determining a sensitivity value. Optionally, the aircraft includes a gyroscopic compass in communication with the apparatus and the apparatus includes a comparator arrangement for comparing a gyroscopic compass value with the sensitivity value to determine a bank angle resultant value and the bank angle resultant value is used to alter a displayed bank angle.

The present invention preferably further includes a device for displaying the bank angle determined by the bank angle determination arrangement. Further, the apparatus preferably includes a display arrangement including a housing configured to mount the device in an aircraft control panel.

Additionally, the present invention may include a portable, hand-held housing. The receiver and signal processor may also be disposed in a preexisting, hand-held, commercially available satellite navigational receiver having a housing and a display screen and the sensitivity determining arrangement the heading change rate determining arrangement and the bank angle determining arrangement are all disposed within the housing and are operatively connected to the receiver, the signal processor and display screen for using the hand-held receiver in a moving aircraft to display the bank angle thereof.

Optionally, the aircraft may be equipped with an automatic piloting system and the bank angle determination arrangement is operatively connected thereto to apply the determined bank angle to the automatic piloting system.

Preferably, the signal processor includes an arrangement to define a first aircraft position and a second aircraft position different from the first aircraft position and the arrangement for determining aircraft speed includes an arrangement for calculating aircraft speed based on the distance between the first aircraft position and the second aircraft position and the time of traversal of that distance.

The signal processor of the apparatus may include an arrangement for determining the Doppler shift in satellite carrier frequency and the arrangement for determining aircraft speed may include a microprocessor preprogrammed with information to include the fixed velocity of the satellites and an arrangement to relate the Doppler shift of the satellite carrier frequency with the satellite velocity to determine an effective Doppler shift in satellite carrier frequency which is proportional to aircraft speed.

It is preferred that the navigation signals include a clock signal and the arrangement for determining the rate of change of the aircraft track heading includes an arrangement for predicting the straight line displacement of the aircraft after a predetermined time period based on the aircraft heading and an arrangement for determining the actual displacement of the aircraft after the predetermined time period and an arrangement for determining the deviation of actual displacement from predicted displacement per unit time as measured by the clock signal, thereby determining the rate of change of the aircraft track heading.

A method for determining the bank angle of the moving aircraft is also disclosed and comprises the steps of receiving navigational signals from satellites in orbit around the earth, processing the navigational signals, determining a sensitivity value, with the sensitivity value being defined as the amount of bank angle displayed per rate of change of track heading speed based on the processed signals, determining the rate of change of the aircraft track heading from the navigational signals, determining the bank angle of the aircraft from the sensitivity value and rate of change of aircraft track heading and displaying the aircraft bank angle in a pilot readable manner. Preferably, the method of determining aircraft bank angle includes determining the bank angle using the sensitivity value and the rate of change of track heading.

Preferably, the sensitivity determining step includes detecting and evaluating a predetermined sensitivity value preprogrammed during manufacture of the apparatus. It is preferred that the apparatus include an electronic circuit having a predetermined value of sensitivity applied thereto and the method further includes the step of adjusting the predetermined value by a pilot.

The method further preferably includes the step of determining aircraft speed using satellite navigation signals and determining the sensitivity value using the aircraft speed. The method preferably further includes the step of determining a sensitivity value based on aircraft orientation when the aircraft is executing a banking maneuver of known angular value. The method preferably further includes the steps of providing a control arrangement associated with the apparatus for controlling signals into and out of the arrangement for determining a sensitivity value and wherein the step of determining a sensitivity value includes using the control arrangement to affect the sensitivity value based on predetermined values within the control arrangement and from feedback from the arrangement for determining a sensitivity value.

The method further preferably includes the step of providing a gyroscopic compass in said aircraft in communication with the present apparatus and the apparatus includes a comparator arrangement for comparing a gyroscopic compass value with the sensitivity value and the step of determining a sensitivity value includes using the comparator arrangement to determine a bank angle resultant value and using the bank angle resultant value to alter a display bank angle.

By the above, the present invention provides an accurate, reliable instrument for displaying the bank angle of a moving aircraft to thereby aid the pilot in turn coordination. The present invention is usable under all weather conditions, at all times, and is not affected by solar conditions.

DETAILED DESCRIPTION OF THE PREFERRED EMBODIMENT

Figure 1:
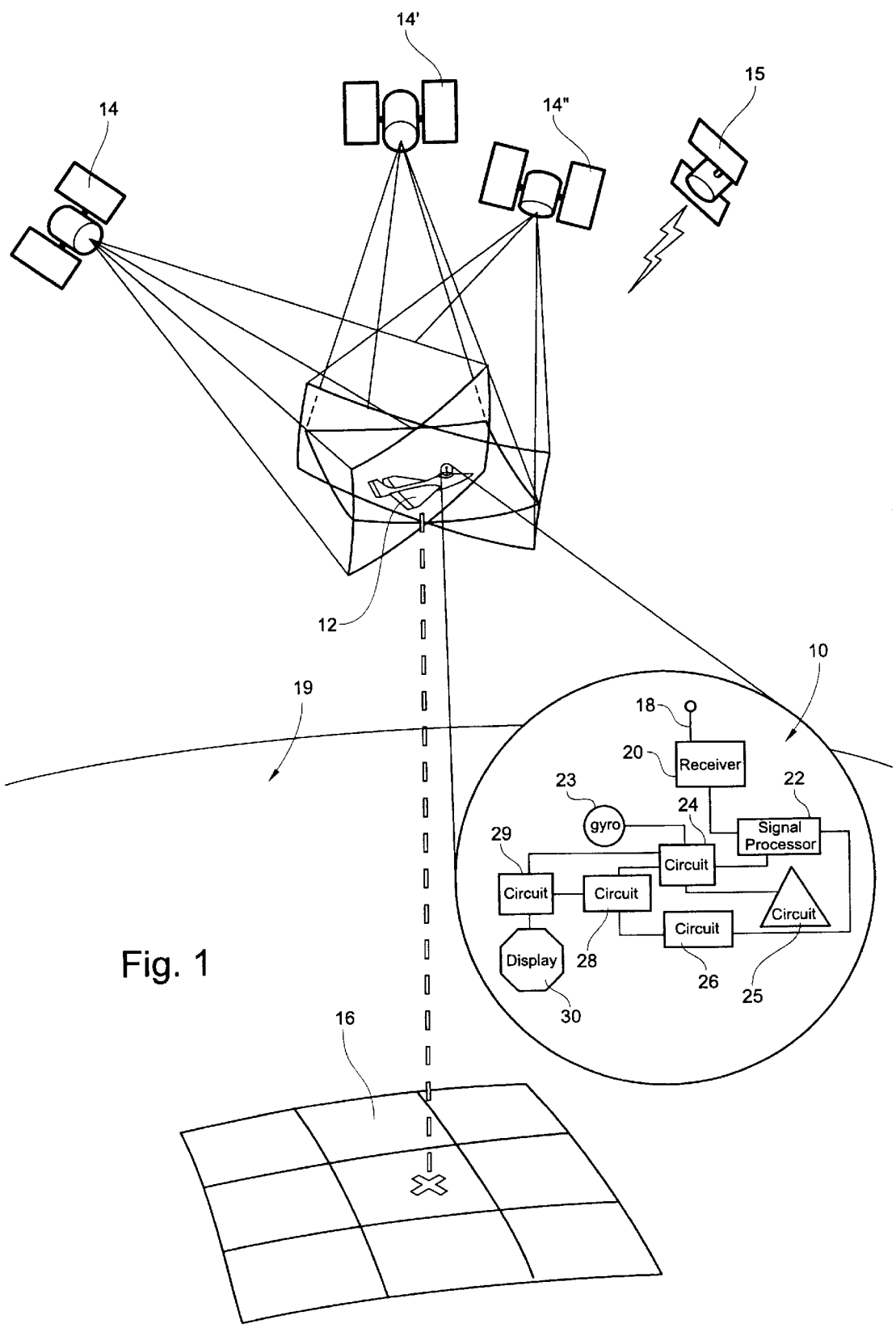
FIG. 1 is a diagrammatic view of an aircraft equipped with the preferred embodiment of the present invention illustrating the manner in which the satellites are used to determine aircraft position and illustrating a block diagram of the present invention using the satellite information.

Looking now at the accompanying drawings at initially at FIG. 1, an apparatus for determining the bank angle of a moving aircraft is diagrammatically illustrated at 10 and includes an antenna 18 which is connected to a receiver 20 which is in turn connected to a signal processor 22. The signal processor 22 is operatively connected to an aircraft control circuit 24 and a circuit 26 for determining the rate of change of the aircraft track heading. These two circuits 24,26 are operatively connected to a sensitivity determination circuit 28 for determining the bank angle of the moving aircraft based on signals emitted from the control circuit 24 and the track heading change rate determination circuit 26. The control circuit 24 includes inputs from an on board gyroscopic compass 23 or "gyro" and from a pilot operable adjustment circuit 25. Finally, a display 30 is operatively connected to the sensitivity determination circuit 28 for displaying the bank angle of the aircraft. Operation of the circuits will be explained in greater detail hereinafter. However, it should be noted that, while the circuits utilized with the present invention are presented in the present application in block diagram form, the electronics to carry out the various functions are well known and their arrangement is well within the skill of those versed in the art of avionics.

As can be seen in FIG. 1, the apparatus 10 of the present invention is mounted in an aircraft 12 and communicates with the NAVSTAR/GPS satellites 14,14',14",15 to acquire the necessary navigational signals. As is well known, electronic signals emitted from a point emanate from that point spherically. If an object, such as an aircraft, encounters the electronic signal, its distance to the signal source may be determined. However, its position may be anywhere on a sphere surrounding the electronic signal at the given distance. This is illustrated by the sphere section projection associated with the first NAVSTAR/GPS satellite 14 in FIG. 1. If a second satellite 14' is provided, a second distance becomes known so that the aircraft may be located anywhere along the intersection of the two spheres resulting from the two satellites 14,14'. If a third satellite 14" is added, the distance to the third satellite from the aircraft may be known and the intersection of all three spheres provides two possible solutions for position. One possible solution will be negative or otherwise unacceptable and the exact position of the aircraft may be determined by the remaining position. This technique is known commonly as triangulation. With twenty-four orbiting NAVSTAR/GPS satellites, an aircraft position anywhere on the globe may be instantaneously determined. Further, Russia has twenty-four Glonass GPS type satellites which increase the global coverage. This should enhance the accuracy and reliability of the present invention beyond that achievable only a few years ago.

Since the NAVSTAR/GPS satellites include atomic clocks and since the terrestrial receivers typically include a quartz clock which could ruin the accuracy advantage provided by the atomic clocks, a fourth satellite 15 is provided to act as the receiver's atomic clock. Using the above information, a conventional NAVSTAR/GPS receiver can determine a position according to latitude and longitude on imaginary grid 16 on the surface of the earth 19. Thereby, the aircraft position can be determined at all times.

A single antenna 18 is provided for the receiver 20. Since all of the calculations performed by the present invention are relative to the changing positional information of the antenna 18, absolute position with respect to latitude and longitude as shown on the grid 16 in FIG. 1 is not a fundamental requirement. Accordingly, the resolution limitations inherent with civilian NAVSTAR/GPS signals is not limiting. The accuracy of the instrument is thus determined by the sampling rate of the receiver which can be controlled. Accordingly, the more rapidly the receiver samples satellite signals, the more accurate the relative positional information becomes.

Initially, the antenna 18 receives the NAVSTAR/GPS navigational signals which are coupled to the receiver 20. The receiver 20 then sends the signals to the signal processor 22 for demodulation. Once the signals are demodulated, preprogrammed microprocessors are called upon to determine the aircraft speed and the rate of change of track heading.

To determine the aircraft speed, either of two techniques may be employed. Initially, speed may be determined directly by determining a first position, a second position, and the time it takes for the aircraft to traverse the distance between the two. All of these values may be calculated from the information acquired from the satellite. A second method for determining the speed of the aircraft is to use the Doppler shift in the frequency of the satellite transmission. The satellite essentially "knows" its position and speed so that any shift in frequency transmitted by the satellite is due to the speed of the aircraft. Conventional circuitry can be applied to determine this speed.

Figure 2:
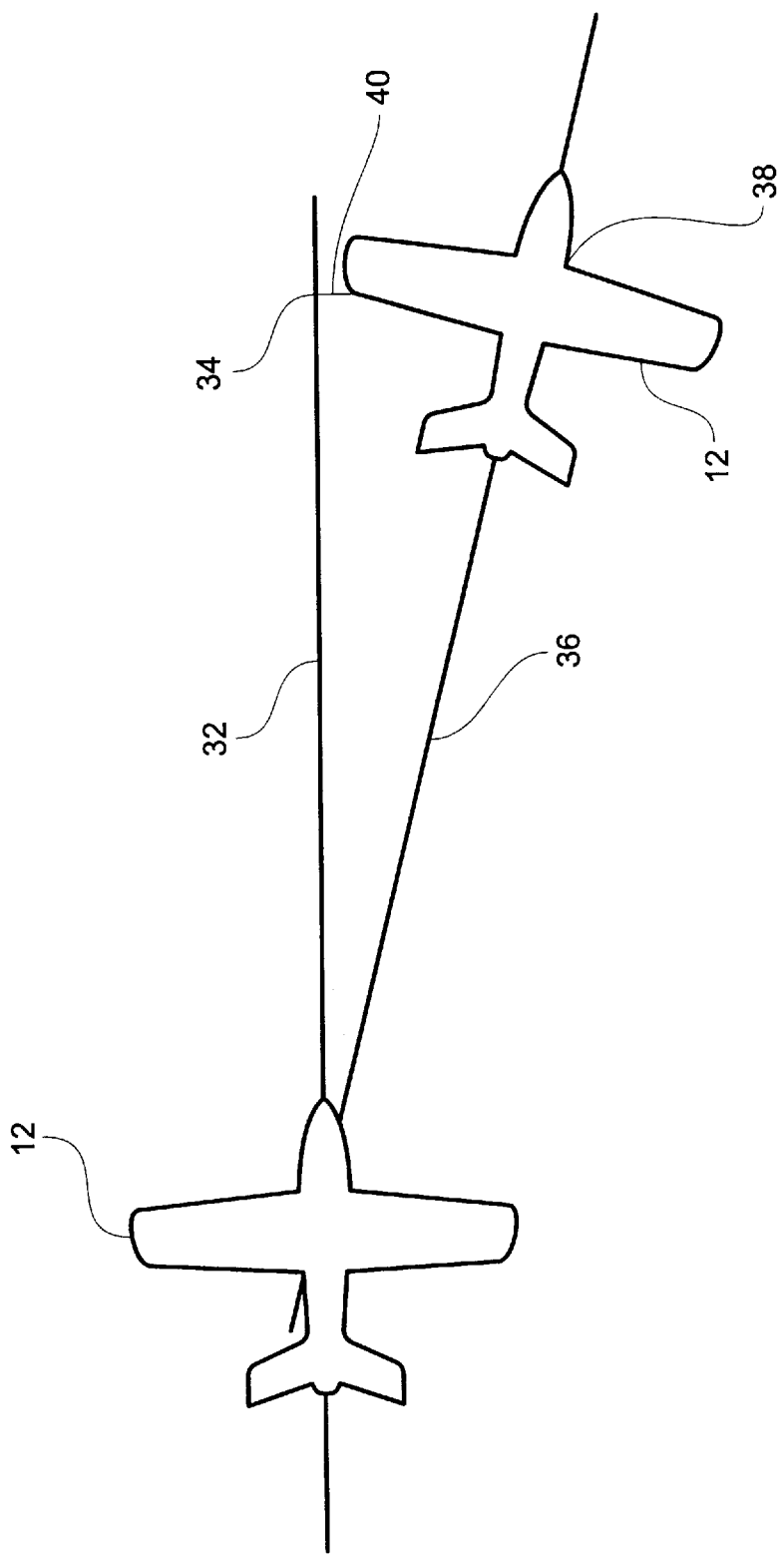
FIG. 2 is a diagrammatic view illustrating the change of aircraft track heading.

With reference to FIG. 2, a turning aircraft 12 is illustrated on a projected track heading 32. As it turns, the aircraft is heading on an actual track 36 on vector, which is constantly changing. Microprocessors within the circuitry of the present invention determine the projected position 34 of the aircraft after a predetermined time period on its projected track 32 at its current speed. The actual position 38 of the aircraft is determined by the NAVSTAR/GPS receiver system and the difference between the actual position 38 and projected position 34 provides a deviation 40 from the projected track heading 32. Clock signals are used in conjunction with the change in track heading to determine the rate of change of the deviation from track heading and this information is directly proportional to the bank angle of the aircraft. Accordingly, as bank angle increases the rate of change of track heading increases.

The present invention operates based on a value for sensitivity. Sensitivity is the amount of bank angle displayed per amount of track change per unit time or the bank angle per change rate of track heading. There are several ways to incorporate the sensitivity value into a determination of aircraft bank angle. They may be used singly or in combination. Initially, a fixed value of sensitivity may be programmed into the control circuit 24 and, accordingly, the sensitivity remains a fixed value as set during manufacture. Therefore, the bank angle is directly proportional to the rate of change of track heading. Optionally, the user or pilot can set a value using a pilot-accessible control 25. Further, the control circuit may be preprogrammed to calculate aircraft speed from the satellite navigational signals emitted from the signal processor 22 as previously described. Therefore, the sensitivity may be either increased or decreased based on the ground speed which is combined with the rate of change of track heading and the sensitivity determining circuit 28 for output to the bank angle determining circuit 29 for display in the display on the display apparatus 30.

Another way the present invention determines sensitivity is by having the pilot enter a turn of known bank angle and hold it for a predetermined time. The sensitivity determining circuit 28 will then calculate a sensitivity value and use this to determine the proper bank angle to be displayed. Finally, the output of the bank angle determination circuit 29 may be compared with the gyroscope output 23, an average determined or one may override the other in the control circuit 24 to determine an ultimate bank angle resultant value which is processed by the bank angle determination circuit 29 for display on the display unit 30.

The signal emitted by the circuit for determining the rate of change of track heading is combined with the sensitivity value in a bank angle determination circuit 29 which calculates the bank angle of the aircraft. This information is then displayed on a display unit 30 in a pilot readable manner. In addition, this information can be used by an aircraft autopilot system for turn guidance.

Figure 3:
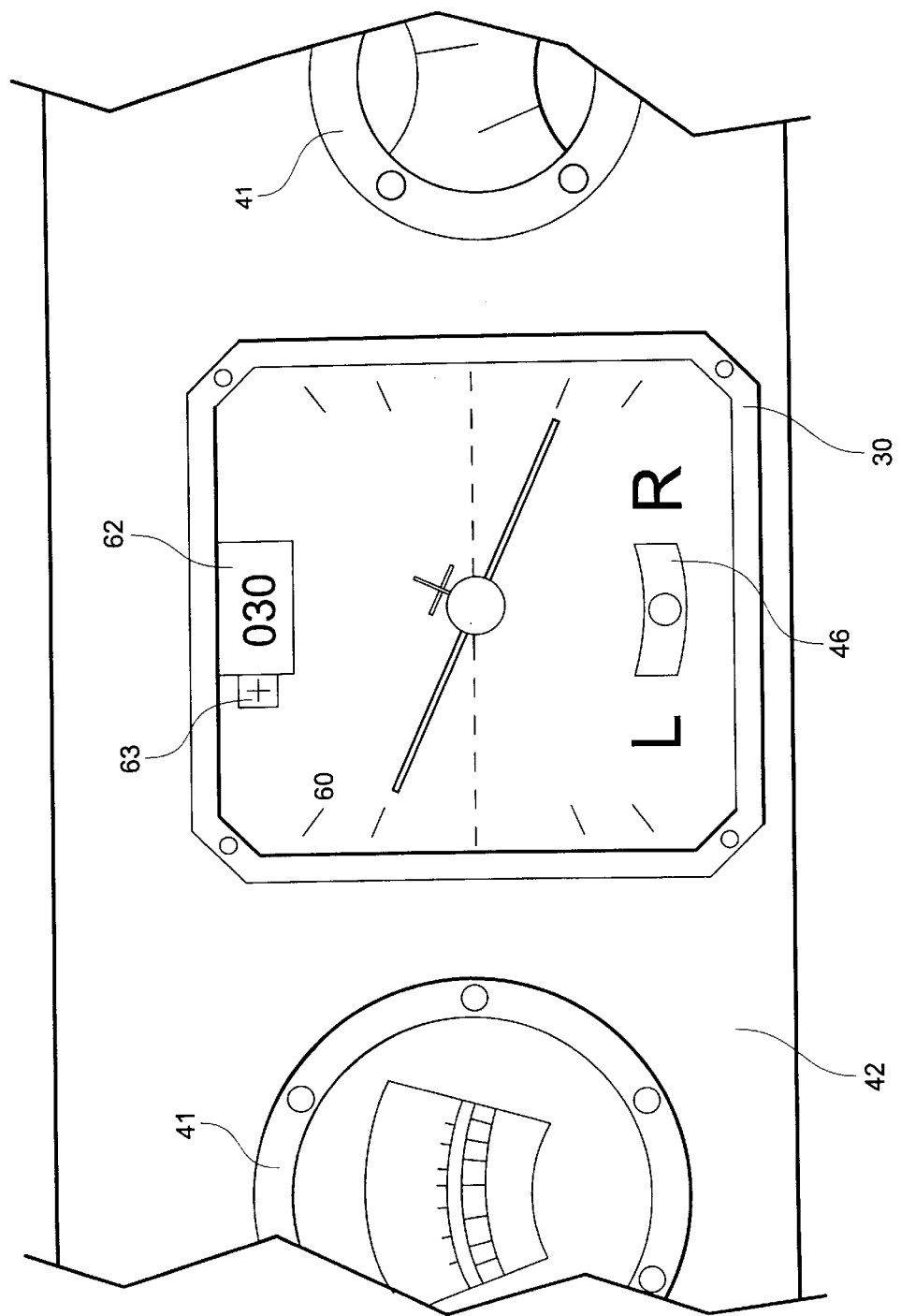
FIG. 3 is a front view of an aircraft instrument displaying bank angle according to the present invention in a control panel setting.

The display 30 may take a number of forms. Preferably, the display is included in the control panel 42 of an aircraft as best seen in FIG. 3. The illustration in FIG. 3 discloses the bank angle display 30 as an electronic display unit in an aircraft control panel 42 housing other instruments 41. The display 30 includes an aircraft silhouette 60 providing a graphical indication of the aircraft in a banking turn and a digital display 62 to provide a digital readout of the actual bank angle. Alternately, the aircraft silhouette 60 can be held stationary with the horizon being tilted to indicate banking. A supplementary indicator 63 is provided to provide a "positive" indication for an increasing change in track heading and a "negative" indication for a decreasing change in track heading. Preferably, the display 30 is in the form of a liquid crystal diode. The display 30 can be combined with a bubble indicator 46 which indicates the lateral forces acting on the aircraft and is an indication of slip requiring sudden manipulation for correction. The combined bank angle display 30 and bubble display 46 provide a coordinated turn indicator in an aircraft instrument panel setting.

Figure 4:
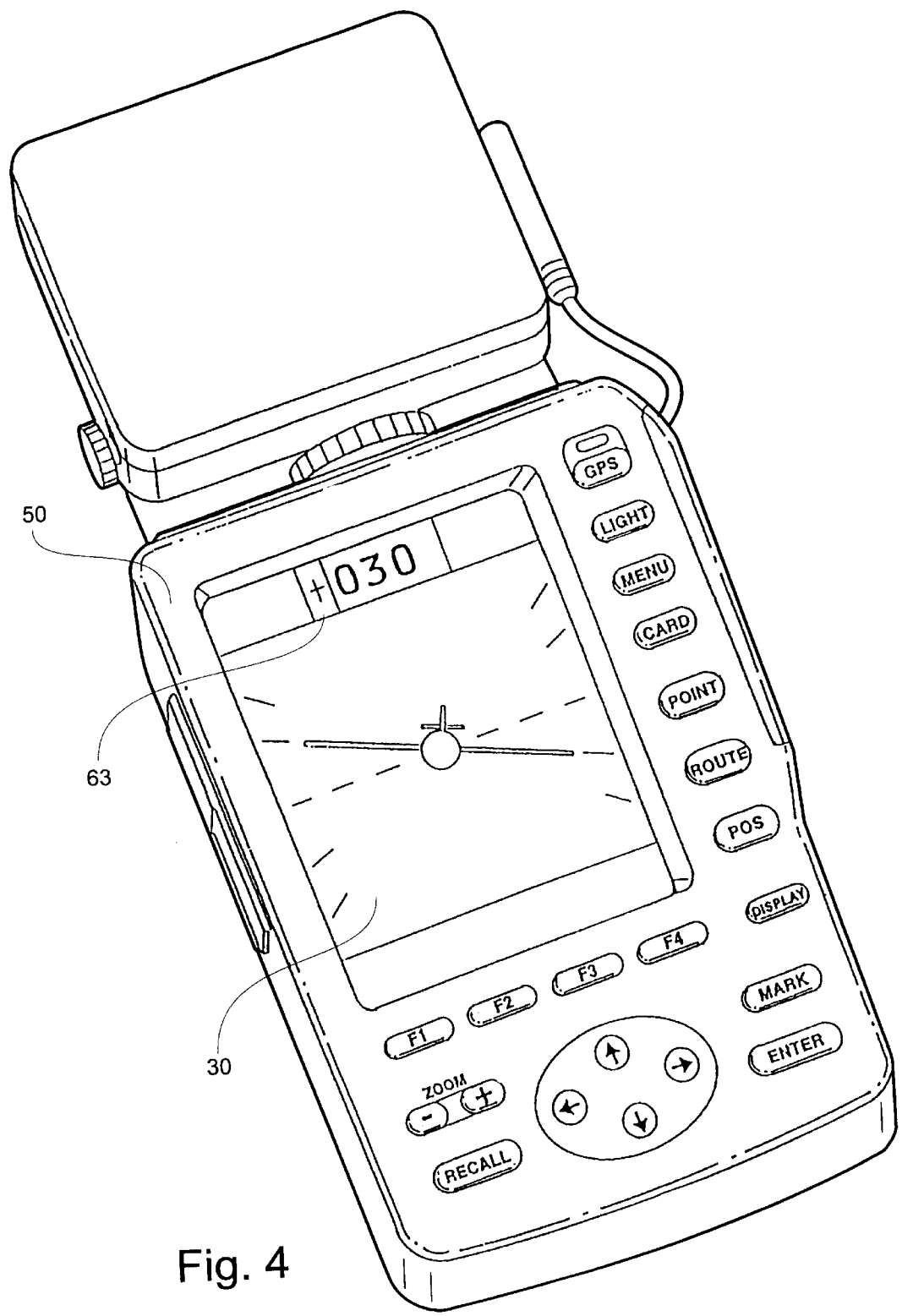
FIG. 4 is a perspective view of a hand-held commercial NAVSTAR/GPS receiver displaying aircraft bank angle.

Turning now to FIG. 4, a commercially available NAVSTAR/ GPS receiver 50 is depicted. The configuration shown is available from Sony as a PYXIS IPS-760 hand-held receiver and is available from Sony, One Sony Drive, Park Ridge, N.J. 07656. The receiver 50 conventionally provides a graphic display of latitude and longitude and may include map information. The unit is battery powered and includes a slot (not shown) for memory cards. It is contemplated by the present invention that the aircraft bank angle display 30 may be incorporated into the hand-held NAVSTAR/GPS receiver 50 to provide a hand-held display for aircraft which are otherwise not equipped with the conventional instrument panel display.

Figure 5:
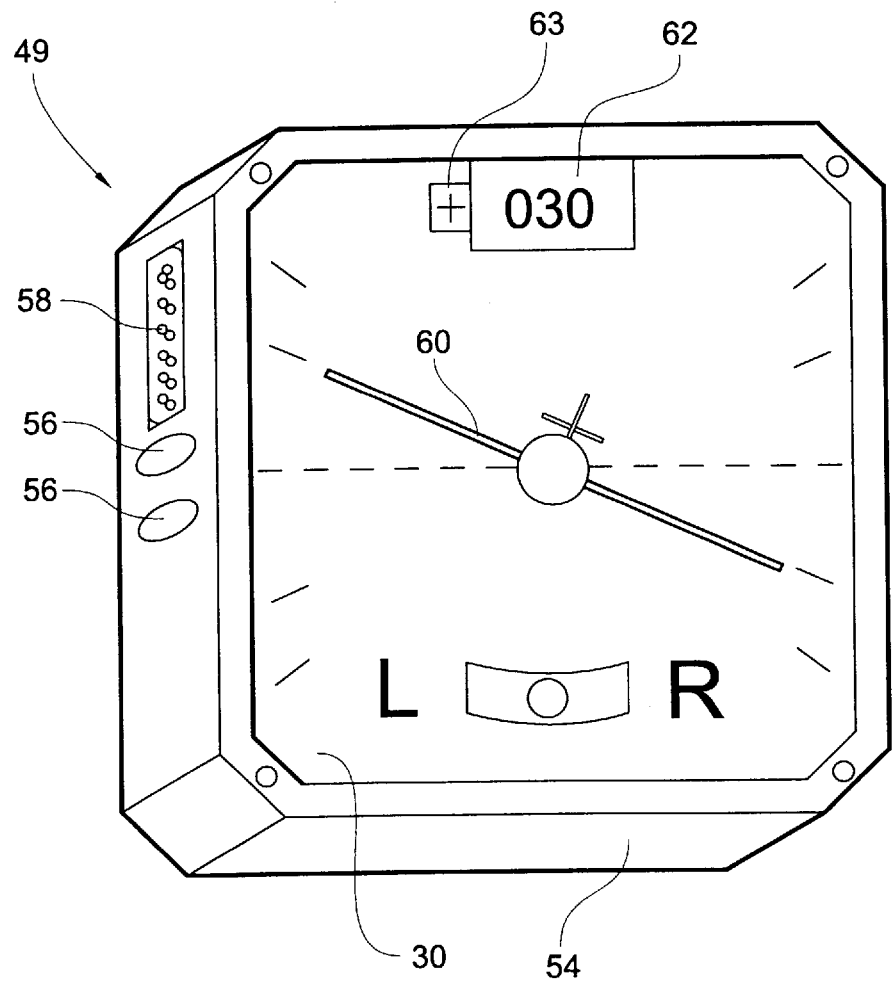
FIG. 5 is a perspective view of a hand-held device for displaying aircraft bank angle.

As a further option, FIG. 5 illustrates a hand-held aircraft bank angle display unit 49 including a housing 54, control switches 56 and an input-output connector 58. This hand-held unit provides a display 30 which is similar to the display 30 incorporated for the control panel unit. This unit 49 will require associated cabling to utilize signals from the sensitivity determination circuit within the aircraft's avionics system according to the present invention, and as previously described.

By the above, the present invention provides a simple, accurate and reliable instrument for determining and displaying the bank angle of a moving aircraft and thereby providing the pilot with accurate directional information for enhanced flight safety.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. Apparatus for determining the bank angle of an aircraft comprising:

receiver means for receiving navigational signals from satellites in orbit about the earth;

signal processing means for demodulating the satellite navigational signals;

means for determining the rate of change of the aircraft track heading from said navigational signals;

means for determining a sensitivity value for said apparatus said sensitivity value being defined as the amount of bank angle displayed per rate of chance of track heading; and means for determining the bank angle of the aircraft from said rate of change in track heading and said sensitivity value wherein said bank angle is proportional to said rate of change in track heading and said sensitivity value;

wherein said apparatus includes an electronic circuit having a predetermined value of sensitivity applied thereto and means for adjusting said predetermined value accessible by a pilot, and said sensitivity determining means includes an electronic circuit configured to detect and evaluate said sensitivity value.

2. Apparatus for determining the bank angle of an aircraft according to claim 1, further comprises display means for displaying the determined bank angle, said display means includes housing means configured to mount said apparatus in an aircraft control panel.

3. Apparatus for determining the bank angle of an aircraft according to claim 1, further comprises display means for displaying the determined bank angle, said display means includes a portable, hand held housing.

4. Apparatus for determining the bank angle of an aircraft comprising:

receiver means for receiving navigational signals from satellites in orbit about the earth;

signal processing means for demodulating the satellite navigational signals;

means for determining the rate of change of the aircraft track heading from said navigational signals;

means for determining a sensitivity value for said apparatus, said sensitivity value being defined as the amount of bank angle displayed per rate of change of track heading; and means for determining the bank angle of the aircraft from said rate of change in track heading and said sensitivity value wherein said bank angle is proportional to said rate of change in track heading and said sensitivity value;

wherein said sensitivity determining means includes an electronic circuit configured to detect and evaluate a predetermined sensitivity value preprogrammed during manufacture of said apparatus.

5. Apparatus for determining the bank angle of an aircraft according to claim 4 and further comprising means for displaying said bank angle determined by said determining means in a pilot readable manner.

6. Apparatus for determining the bank angle of an aircraft according to claim 4 wherein the aircraft includes an automatic piloting system and said bank angle determining means is operatively connected to the automatic piloting system and includes means for operationally applying the determined bank angle to the automatic piloting system.

7. Apparatus for determining the bank angle of an aircraft comprising:

receiver means for receiving navigational signals from satellites in orbit about the earth;

signal processing means for demodulating the satellite navigational signals;

means for determining the rate of change of the aircraft track heading from said navigational signals;

means for determining a sensitivity value for said apparatus, said sensitivity value being defined as the amount of bank angle displayed per rate of change of track heading; and means for determining the bank angle of the aircraft from said rate of change in track heading and said sensitivity value wherein said bank angle is proportional to said rate of change in track heading and said sensitivity value;

wherein said sensitivity determining means includes means for determining a sensitivity value based on aircraft orientation when the aircraft is executing a banking maneuver of a known angular value.

8. Apparatus for determining the bank angle of an aircraft comprising:

receiver means for receiving navigational signals from satellites in orbit about the earth;

signal processing means for demodulating the satellite navigational signals;

means for determining the rate of change of the aircraft track heading form said navigational signals;

means for determining a sensitivity value for said apparatus said sensitivity value being defined as the amount of bank angle displayed per rate of change of track heading;

means for determining the bank angle of the aircraft from said rate of change in track heading and said sensitivity value wherein said bank angle is proportional to said rate of change in track heading and said sensitivity value; and control means for controlling signals into and out of said means for determining a sensitivity value, and wherein said control means effects said sensitivity value based on predetermined values within said control means and from feedback from said means for determining a sensitivity value.

9. Apparatus for determining the bank angle of an aircraft comprising:

receiver means for receiving navigational signals from satellites in orbit about the earth;

signal processing means for demodulating the satellite navigational signals;

means for determining the rate of change of the aircraft track heading from said navigational signals;

means for determining a sensitivity value for said apparatus said sensitivity value being defined as the amount of bank angle displayed per rate of change of track heading; and means for determining the bank angle of the aircraft from said rate of change in track heading and said sensitivity value wherein said bank angle is proportional to said rate of change in track heading and said sensitivity value;

wherein said aircraft includes a gyroscopic compass in communication with said apparatus and said apparatus includes comparator means for comparing a gyroscopic compass value with said sensitivity value to determine a bank angle resultant value and said bank angle resultant value is used to alter a displayed bank angle.

10. A method for determining the bank angle of a moving aircraft comprising the steps of:

providing an apparatus for determining the bank angle of an aircraft;

receiving navigational signals from satellites in orbit about the earth using a receiver;

processing said navigational signals using a signal processor associated with said bank angle determining apparatus;

determining a sensitivity value for said apparatus using an electronic circuit for determining said sensitivity value associated with said bank angle determining apparatus, said sensitivity value being defined as the amount of bank angle displayed per rate of change of track heading;

determining the rate of change of the aircraft track heading from said navigational signals using an electronic circuit associated with said bank angle determining apparatus for determining the bank angle of the aircraft from said sensitivity value and said rate of change of aircraft track heading; and displaying the aircraft bank angle in a pilot readable manner using a display instrument associated with said bank angle determining apparatus;

wherein said sensitivity determining step includes detecting and evaluating a predetermined sensitivity value preprogrammed during manufacture of said apparatus.

11. A method for determining the bank angle of a moving aircraft comprising the steps of:

providing an apparatus for determining the bank angle of an aircraft;

receiving navigational signals from satellites in orbit about the earth using a receiver;

processing said navigational signals using a signal processor associated with said bank angle determining apparatus;

determining a sensitivity value for said apparatus using an electronic circuit for determining said sensitivity value associated with said bank angle determining apparatus, said sensitivity value being defined as the amount of bank angle displayed per rate of change of track heading;

determining the rate of change of the aircraft track heading from said navigational signals using an electronic circuit associated with said bank angle determining apparatus for determining the bank angle of the aircraft from said sensitivity value and said rate of change of aircraft track heading; and displaying the aircraft bank angle in a pilot readable manner using a display instrument associated with said bank angle determining apparatus;

wherein said apparatus includes an electronic circuit having a predetermined value of sensitivity applied thereto and said method further includes the step of adjusting said predetermined value by a pilot.

12. A method for determining the bank angle of a moving aircraft comprising the steps of:

providing an apparatus for determining the bank angle of an aircraft;

receiving navigational signals from satellites in orbit about the earth using a receiver;

processing said navigational signals using a signal processor associated with said bank angle determining apparatus;

determining a sensitivity value for said apparatus using an electronic circuit for determining said sensitivity value associated with said bank angle determining apparatus, said sensitivity value being defined as the amount of bank angle displayed per rate of change of track heading;

determining the rate of change of the aircraft track heading from said navigational signals using an electronic circuit associated with said bank angle determining apparatus for determining the bank angle of the aircraft from said sensitivity value and said rate of change of aircraft track heading; and displaying the aircraft bank angle in a pilot readable manner using a display instrument associated with said bank angle determining apparatus;

wherein said method further includes the step of determining a sensitivity value based on aircraft orientation when the aircraft is executing a banking maneuver of a known angular value.

13. A method for determining the bank angle of a moving aircraft comprising the steps of:

providing an apparatus for determining the bank angle of an aircraft;

receiving navigational signals from satellites in orbit about the earth using a receiver;

processing said navigational signals using a signal processor associated with said bank angle determining apparatus;

determining a sensitivity value for said apparatus using an electronic circuit for determining said sensitivity value associated with said bank angle determining apparatus, said sensitivity value being defined as the amount of bank angle displayed per rate of change of track heading;

determining the rate of change of the aircraft track heading from said navigational signals using an electronic circuit associated with said bank angle determining apparatus for determining the bank angle of the aircraft from said sensitivity value and said rate of change of aircraft track heading;

displaying the aircraft bank angle in a pilot readable manner using a display instrument associated with said bank angle determining apparatus; and providing control means associated with said apparatus for controlling signals into and out of said electronic circuit for determining a sensitivity value, and wherein said step of determining a sensitivity value includes using said control means to effect said sensitivity value based on predetermined values within said control means and from feedback from said electronic circuit for determining a sensitivity value.

14. A method for determining the bank angle of a moving aircraft comprising the steps of:

providing an apparatus for determining the bank angle of an aircraft;

receiving navigational signals from satellites in orbit about the earth using a receiver;

processing said navigational signals using a signal processor associated with said bank angle determining apparatus;

determining a sensitivity value for said apparatus using an electronic circuit for determining said sensitivity value associated with said bank angle determining apparatus, said sensitivity value being defined as the amount of bank angle displayed per rate of change of track heading;

determining the rate of change of the aircraft track heading from said navigational signals using an electronic circuit associated with said bank angle determining apparatus for determining the bank angle of the aircraft form said sensitivity value and said rate of change of aircraft track heading, and displaying the aircraft bank angle in a pilot readable manner using a display instrument associated with said bank angle determining apparatus;

wherein said aircraft includes a gyroscopic compass in communication with said aircraft apparatus includes comparator means for comparing a gyroscopic compass value with said sensitivity value and the step of determining a sensitivity value includes using said comparator means to determine a bank angle resultant value and using said bank angle resultant value to alter a displayed bank angle.

* * * * *